United States Patent [19]

Fecto

[11] Patent Number: 5,042,968
[45] Date of Patent: Aug. 27, 1991

[54] PROPELLER BLADE SUBASSEMBLY AND METHOD FOR MAKING A PROPELLER BLADE SUBASSEMBLY

[75] Inventor: Marcia A. Fecto, North Canton, Conn.

[73] Assignee: United Technologies Corporation, Hartford, Conn.

[21] Appl. No.: 430,836

[22] Filed: Nov. 2, 1989

[51] Int. Cl.⁵ .............................. B64C 11/26
[52] U.S. Cl. ........................... 416/226; 416/229 R; 416/241 R; 29/889.60; 29/889.70; 29/889.71; 264/46.60; 264/46.70
[58] Field of Search ............ 416/223 R, 223 A, 226, 416/229 R, 229 A, 241 R, 241 A; 156/245; 425/4 R, 116, 117, 817 R; 29/889.6, 889.7, 889.71; 264/46.6, 46.7

[56] References Cited

U.S. PATENT DOCUMENTS

| | | | |
|---|---|---|---|
| 3,923,421 | 12/1975 | Carter et al. | 416/241 A |
| 4,213,739 | 7/1980 | Euler et al. | 416/226 |
| 4,470,862 | 9/1984 | More et al. | 416/226 |
| 4,471,020 | 9/1984 | McCarthy | 264/46.6 X |
| 4,626,173 | 12/1986 | Mouille et al. | 416/226 |
| 4,648,921 | 3/1987 | Nutter Jr. | 416/226 |
| 4,650,534 | 3/1987 | Mussi et al. | 416/226 |
| 4,696,623 | 9/1987 | Bost | 416/226 |
| 4,806,077 | 2/1989 | Bost | 416/226 |

Primary Examiner—John T. Kwon
Assistant Examiner—James A. Larson

[57] ABSTRACT

A propeller blade spar/foam subassembly is manufactured by disposing a lamination of prepreg within a mold, closing the mold about a spar and injecting foam into mold cavities formed at the lead edge and the trailing edge of the spar.

4 Claims, 1 Drawing Sheet

PROPELLER BLADE SUBASSEMBLY AND METHOD FOR MAKING A PROPELLER BLADE SUBASSEMBLY

TECHNICAL FIELD

This invention relates to propeller blades, and more particularly to a propeller blade subassembly and a method for manufacturing such subassembly.

BACKGROUND ART

Some aircraft propeller blades are comprised of an airfoil surface and a spar/foam subassembly which is encased by the airfoil surface. The airfoil surface may comprise a fiber reinforced skin which is preformed as a shell or is formed by wrapping layers of a fiber matrix about the spar/foam subassembly. The spar/foam subassembly, which forms the main structural member of the blade, is comprised of a spar, formed typically of aluminum or the like, and a thermoset foam disposed at the leading and trailing edges of the spar. The spar extends along a substantial length of the airfoil surface and includes a root portion by which the blade is attached to a hub.

To manufacture a finished propeller blade, the subassembly is covered or wrapped with the fiber reinforced skin which is impregnated with a resin and cured. To manufacture the subassembly, a release agent is sprayed within a mold. A thermoset adhesive, which acts as a relatively finished surface for the subassembly, is sprayed upon the release agent. The mold is masked to avoid overspray of the adhesive thereby minimizing cleanup and maintaining tolerances within the mold. The spar is placed in the mold and the mold is heated to about 250° F. for a given time to cure the adhesive. After the mold is cooled to about 150° F., the thermoset foam is injected within the mold along the spar leading and trailing edges. The mold is then heated to about 250° F. for a given time to cure the foam. Upon removal, the subassembly may be exposed to ultra-violet light to reveal any release agent disposed thereon. The spar/foam subassembly is then abraded to remove surface contamination and to texture the surface for subsequent bonding to the airfoil surface.

Several problems with the method exist: the cured adhesive may delaminate from the foam providing a poor subassembly surface thereby; the cured adhesive must be reworked to provide a bonding surface for the airfoil surface; the cured adhesive is opaque thereby concealing defects in the underlaying foam; the adhesive coating may break during handling causing rework; the amount of surface contamination of the subassembly is undesirable because of interaction between the release agent and the sprayed adhesive; the spar is heated for a prolonged period which is undesirable if further heat treating is required; and, excessive time and energy is required to heat and cool the mold to cure the adhesive.

Accordingly, a new method of manufacturing a spar/foam subassembly, and a new spar/foam subassembly is sought.

DISCLOSURE OF INVENTION

It is the object of the invention to manufacture a spar/foam subassembly in a minimum amount of time and utilizing a minimum amount of energy.

It is a further object of the invention to provide a spar/foam subassembly which requires a minimum amount of rework.

It is a further object of the invention to provide an improved spar/foam subassembly surface for applying an airfoil surface thereto.

It is a further object of the invention to provide a spar/foam subassembly which is relatively easy to repair.

According to the invention, a spar/foam subassembly is manufactured by disposing a lamination of resin impregnated fiber matrix (i.e. prepreg) within the interior surfaces of a mold, closing the mold about a spar, injecting foam into mold cavities formed at the leading and the trailing edges of the spar and simultaneously curing the spar and the foam.

By using a sheet of prepreg as a finished surface for the foam and spar several advantages accrue: an ideal surface is presented for bonding an airfoil surface (i.e. a shell or wraps) thereto; the prepreg is cured with the foam and, as such, no additional curing of any adhesive is required; the heating time of the spar is minimized; masking of the mold is minimized, surface delaminations are minimized, surface contamination of the subassembly is minimized, and release of the spar/foam subassembly is facilitated as no spray adhesive is used; the prepreg protects the foam better for handling purposes; and, the cured prepreg may be transparent thereby facilitating the detection and repair of defects in the cured foam.

These and other objects, features, and advantages of the present invention will become more apparent in light of the detailed description of the best mode embodiment thereof, as illustrated in the accompanying drawing.

BEST MODE FOR CARRYING OUT THE INVENTION

Figure 1:
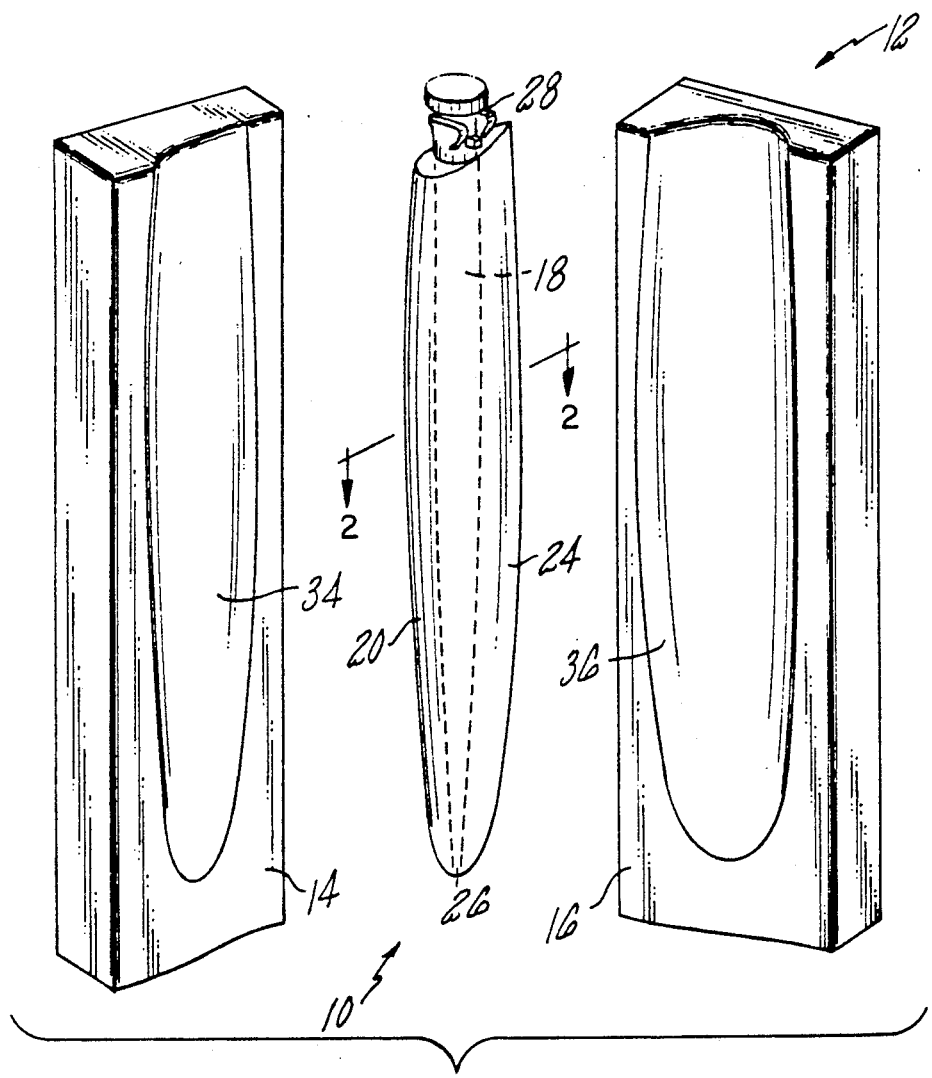
FIG. 1 is a perspective view of aircraft propeller blade subassembly manufactured in a mold in accordance with the teachings of the present invention.
Figure 2:
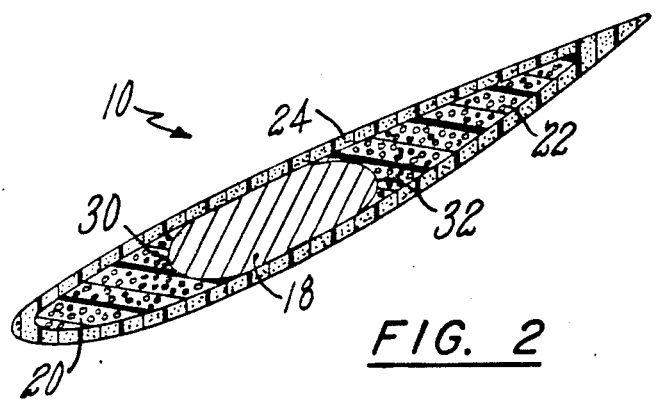
FIG. 2 is a cross-sectional view of the subassembly of FIG. 1 taken along the line 2—2.

Referring to FIGS. 1 and 2, a spar/foam subassembly 10 for a propeller blade (not shown) is shown after removal from a mold 12. The mold 12 has two mating halves 14, 16 which form a cavity conforming to the finished shape of the subassembly 10. As is known in the art, the mold 12 has vents (not shown) for injecting a thermoset foam into portions of the cavity. The subassembly 10 includes a spar 18, a leading edge foam portion 20, a trailing edge foam portion 22, and a skin 24. The subassembly 10 is designed to be covered by an airfoil surface (not shown) and forms the main structural member of a propeller blade (not shown).

The spar 18 has a tip portion 26, a root portion 28, a leading edge 30, and a trailing edge 32. The spar 18 extends along the length of the subassembly 10 and attaches by the root portion 23 to a hub (not shown).

Referring to FIG. 2, the spar/foam subassembly 10 is shown in cross-section. The leading edge foam portion 20 attaches to the leading edge 30 of the spar 18. The trailing edge foam portion 22 attaches to the trailing edge 32 of the spar 18. The foam portions 20, 22 are comprised of a thermoset foam such as a two component, semi-prepolymer rigid urethane foam. The skin 24, which forms a surface for bonding an airfoil surface (not shown) thereto encloses the spar 18, the leading edge foam portion 20 and the trailing edge foam portion 22. The skin 24 is comprised of a prepreg having a glass cloth matrix and an epoxy filler. The spar 18 is coated with an adhesive, such as a thermosetting nonvolatile modified epoxy liquid adhesive, for bonding the spar 18 to the skin 24.

The spar 18, the skin 24 and the foam portions 20, 22 are manufactured into the subassembly 10 by the following process. A release agent is sprayed within the interior surfaces 34, 36 of each half of the mold 14, 16. A sheet of prepreg is laid up over the release agent so that the prepreg conforms to the shape of the interior surfaces 34, 36. The root portion 28 of the spar 18 is placed within a holding cavity (not shown) in the mold 12 such that the length of the spar 18 hangs downwardly. The mold halves 14, 16 are then joined together and heated to a range from about 120° to 150° F. (about 130° F. is preferred). The urethane foam is then injected into the mold 12 adjacent the leading and trailing edges of the spar 18. After injection of the foam, the mold temperature is raised to about 250° F. for about two hours to cure the prepreg and the foam.

After cooling, the subassembly 10 is removed for inspection and further assembly into a finished propeller blade. Because the glass matrix forms a transparent surface, defects in the foam portions 20, 22, such as voids, may be easily observed and repaired. Foam may be injected through the skin 24 to fill such voids. Excess prepreg is trimmed from the subassembly leading and trailing edges. The airfoil surface is then formed over the subassembly 10 to assemble a finished propeller blade.

Although this invention has been shown and described with respect to detailed embodiments thereof, it will be understood by those skilled in the art that various changes in form and detail thereof may be made without departing from the spirit and scope of the claimed invention.

We claim:

1. Method of constructing a spar/foam subassembly for a propeller blade, comprising the steps of:

lining interior molding surfaces of a pair of mold halves with a layer of prepreg material;

inserting a spar having a leading edge and a trailing edge between said mold halves;

applying an adhesive to said spar for filling in gaps between camber and face sides of the spar and said mold;

after said inserting step, said lining step, and said applying step mating said mold halves to form a first cavity between the molding surfaces and the leading edge of the spar and a second cavity between the molding surfaces and the trailing edge of the spar;

after said mating step, injecting a foam within said first and second cavities; and after said injecting step, simultaneously curing said foam and said prepreg material.

2. Method of constructing a spar/foam subassembly for a propeller blade, according to claim 1 further comprising the step of:

prior to said lining step, applying a release agent to interior surfaces of said mold.

3. Method of constructing a spar/foam subassembly for a propeller blade, according to claim 2, wherein said curing step is performed by raising the temperature of the mold to 250° F.

4. A spar/foam subassembly, for a propeller blade, manufactured according to the process recited in claim 1.

* * * * *